July 5, 1949.   C. A. THOMAS   2,474,871
DYNAMOELECTRIC MACHINE
Filed Oct. 16, 1944
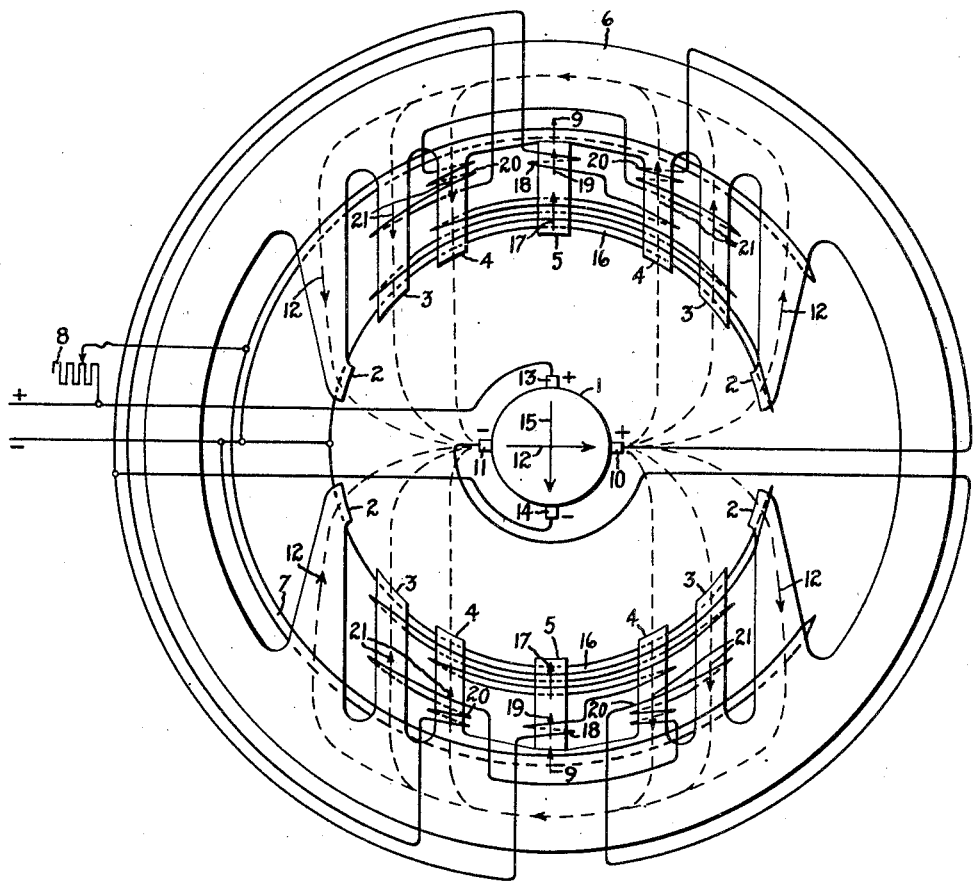
Inventor:
Charles A. Thomas,
by Harry E. Dunham
His Attorney.

Patented July 5, 1949

2,474,871

UNITED STATES PATENT OFFICE 2,474,871

DYNAMOELECTRIC MACHINE

Charles A. Thomas, Fort Wayne, Ind., assignor to General Electric Company, a corporation of New York Application October 16, 1944, Serial No. 558,807

7 Claims. (Cl. 322—92)

My invention relates to dynamoelectric machines and particularly to machines of the amplidyne type in which the cross field due to armature reaction provides the main excitation of the machine.

An object of my invention is to provide an improved dynamoelectric machine of the amplidyne type.

Another object of my invention is to provide a dynamoelectric machine of the armature reaction excited type in which the material of the magnetic circuit is more efficiently utilized in the stationary member of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a schematic end view of a dynamoelectric machine of the amplidyne type provided with an embodiment of my invention.

Referring to the drawing, I have shown an armature reaction excited dynamoelectric machine of the amplidyne type arranged as a generator provided with a rotatable member or armature 1 of the conventional direct current type having a commutator connected to an armature winding and adapted to be driven by any suitable source of mechanical power. For illustrative purposes, the machine is shown as having a two-pole excitation system which comprises polar portions formed of a plurality of polar projections 2, 3, and 4 arranged symmetrically about the secondary or load commutating axis of the armature winding with a commutating polar projection 5 between the polar projections 4, all connected together by the main core portion or yoke 6 of the stationary member of the machine. In the illustrated arrangement, the machine is shown as controlled by a self-excited field exciting winding 7 which is connected across the terminals of the machine through a variable resistor 8 and arranged about the polar projections to provide a component of excitation in the direction of the armature secondary commutating axis, as shown by the arrows 9. This component of excitation is adapted to induce a voltage in the winding of the armature when it is rotated which appears as a voltage between a set of primary brushes 10 and 11 arranged along the primary commutating axis of the machine. These primary brushes are adapted to be short circuited or connected through a relatively low resistance, such as a low resistance field exciting winding, thereby providing a primary circuit through the winding of the armature. Current flowing through the primary armature circuit will produce a primary component of armature reaction, indicated by the arrow 12, which will remain fixed in space substantially at 90 electrical degrees to the secondary or load commutating axis of the machine. As the armature is rotated, its winding will cut the flux resulting from this primary component of armature reaction, and a voltage will be generated in the armature winding which can be measured and applied to a load between a set of secondary brushes 13 and 14 arranged in circumferentially spaced relationship substantially 90 electrical degrees about the commutator from the primary brushes 10 and 11. If a load is connected to the terminals of the armature across the secondary or load brushes 13 and 14, current will flow through the armature winding between these brushes in a circuit which may be called the secondary circuit of the armature, and this current will produce a secondary or load component of armature reaction, indicated by the arrow 15, along the secondary commutating axis of the armature winding, which is opposed in direction to the control component of magnetic excitation 9 of the control field exciting winding 7. In order to increase the sensitivity of the machine, it is desirable that the necessary energization of the control field exciting winding 7 should be as small as possible. This may be obtained by minimizing the effects of the secondary component of armature reaction 15 upon the characteristics of the machine by arranging a compensating field exciting winding 16 about the polar projections 2, 3, 4, and 5 connecting it in series with the secondary brush 14 so that its energization is responsive to the secondary current in the secondary circuit of the armature. This compensating field exciting winding 16 is arranged to provide a component of excitation to the machine, as indicated by the arrow 17, in opposition to the component of armature reaction due to the secondary current in the armature secondary circuit, so as to neutralize substantially this component of armature reaction and thereby neutralize mutual coupling of the secondary current in the armature secondary circuit with the control field exciting winding 7. In order to improve the commutation of the secondary brushes 13 and 14, a commutating field exciting winding 18 is arranged about the commutating polar projection 5 to provide a component of commutating magnetic excitation, indicated by the arrow 19, in the same direction as the compensating component of excitation 17. The function of this commutating field exciting winding is the same as in any conventional direct current machine, and the winding 18 is connected in series with the compensating field exciting winding 16 and the secondary brush 14.

In machines of this type, the polar projections usually are arranged to extend in a direction corresponding to the secondary commutating axis of the armature, such that the portions of the polar projections adjacent the primary commutating axis of the armature tend to be more saturated by this component of armature reaction than the remainder of the magnetic circuit of the stationary member. This difference in the saturation of different parts of the stationary member magnetic circuit is due to a non-uniform distribution of the primary magnetomotive force or component of armature reaction which is a maximum along the primary commutating axis of the armature, and this results in an inefficient use of the magnetic material of the machine. In order to increase the effectiveness of the magnetic material, it is desirable that the primary flux density should be substantially uniform throughout the magnetic circuit of the machine. In addition, the primary current in the primary armature circuit may be reduced, and thereby the heating of the armature may be reduced, and the primary magnetomotive force in the stationary member polar projections can be made more uniform by a special arrangement of a field exciting winding which varies the magnetomotive force in the different polar projections of the stationary member. In the illustrated arrangement, a primary or quadrature series field exciting winding 20 is arranged in the slots in the stationary member between the polar projections with a gradation of turns decreasing from a maximum number of turns on the polar projections 4 near the secondary commutating axis of the machine to a minimum near the primary commutating axis of the armature. As shown, this winding 20 may even omit having any turns on the last polar projection 2 nearest the primary commutating axis of the armature, as this polar projection is in the zone of the maximum magnetomotive force due to the primary component of armature reaction 12. Thus, the component of excitation, indicated by the arrows 21, provided by the series primary field exciting winding 20 tends to provide a substantially uniform primary flux density and uniform primary magnetomotive force throughout the stationary member polar projections and provide for a more efficient utilization of the magnetic material of the stationary member, together with a decrease in the required armature primary current. This arrangement of the stationary member magnetic circuit and of the primary series winding is applicable to machines of this type utilizing any number of desired or necessary control field exciting windings.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent in the United States is:

1. A dynamoelectric machine of the amplidyne type having a stationary member with a plurality of polar portions and an armature with a winding and a commutator connected thereto, a set of primary brushes and a set of secondary brushes electrically displaced from said primary brushes about said commutator adapted to provide a primary circuit and a secondary circuit respectively through said armature winding, means for controlling the secondary characteristics of said machine, means for substantially neutralizing mutual coupling of secondary current in said armature secondary circuit with said control means, and means including a field exciting winding energized in response to primary current in said armature primary circuit arranged to provide a component of excitation to said polar portions for providing substantially a uniform primary flux density and primary magnetomotive force throughout said stationary member polar portions, said last mentioned field exciting winding being arranged in circuit with said primary brushes on at least two of said polar projections and having more turns on one of said projections than on the other of said projections.

2. A dynamoelectric machine of the amplidyne type having a stationary member with a plurality of polar portions and an armature with a winding and a commutator connected thereto, a set of primary brushes and a set of secondary brushes electrically displaced from said primary brushes about said commutator adapted to provide a primary circuit and a secondary circuit respectively through said armature winding, means including a field exciting winding arranged to provide a component of magnetic excitation along the secondary commutating axis of said armature winding for controlling the secondary characteristics of said machine, means including a compensating field exciting winding energized in response to secondary current in said armature secondary circuit for substantially neutralizing armature reaction due to secondary current in said armature secondary circuit, and means including a field exciting winding energized in response to primary current in said armature primary circuit and arranged to provide a component of excitation to said polar portions for providing substantially a uniform primary flux density and primary magnetomotive force throughout said stationary member polar portions, said last mentioned field exciting winding being arranged in circuit with said primary brushes on at least two of said polar projections and having more turns on one of said projections than on the other of said projections.

3. A dynamoelectric machine of the amplidyne type having a stationary member with a plurality of polar projections and an armature with a winding and a commutator connected thereto, a set of primary brushes and a set of secondary brushes electrically displaced from said primary brushes about said commutator adapted to provide a primary circuit and a secondary circuit respectively through said armature winding, means for controlling the secondary characteristics of said machine, means including a compensating field exciting winding energized in response to current in said armature secondary circuit arranged to provide a component of magnetic excitation along the secondary commutating axis of said armature winding for substantially neutralizing mutual coupling of secondary current in said armature secondary circuit with said control means, and means including a field winding energized in response to primary current in said armature primary circuit and arranged to provide a component of excitation to said polar projections for providing substantially a uniform primary flux density and primary magnetomotive force throughout said stationary member polar projections, said last mentioned field exciting winding being arranged in circuit with said primary brushes on at least two of said polar projections and having a greater number of turns on the polar projection nearest the secondary commutating axis than on the projection nearest the primary commutating axis.

4. A dynamoelectric machine of the amplidyne type having a stationary member with polar portions and an armature with a winding and a commutator connected thereto, a set of primary brushes and a set of secondary brushes electrically displaced from said primary brushes about said commutator adapted to provide a primary circuit and a secondary circuit respectively through said armature winding, means for controlling the secondary characteristics of said machine, means including a compensating field exciting winding energized in response to current in said armature secondary circuit arranged to provide a component of magnetic excitation along the secondary commutating axis of said armature winding for substantially neutralizing mutual coupling of secondary current in said armature secondary circuit with said control means, and means including a field exciting winding energized in response to primary current in said armature primary circuit and arranged in circuit with said primary brushes in winding slots in said stationary member polar portions with a gradation of turns decreasing from a maximum near the secondary commutating axis to a minimum near the primary commutating axis of said armature for providing substantially a uniform primary flux density and primary magnetomotive force throughout said stationary member polar portions.

5. A dynamoelectric machine of the amplidyne type having a stationary member with polar portions and an armature with a winding and a commutator connected thereto, a set of primary brushes and a set of secondary brushes electrically displaced from said primary brushes about said commutator adapted to provide a primary circuit and a secondary circuit respectively through said armature winding, means for providing a component of magnetic excitation along the secondary commutating axis of said armature for controlling the secondary characteristics of said machine, means responsive to current in said armature secondary circuit arranged to provide a component of magnetic excitation along the secondary commutating axis of said armature winding for substantially neutralizing mutual coupling of secondary current in said armature secondary circuit with said control means, and means including a field exciting winding energized in response to primary current in said armature primary circuit and arranged in circuit with said primary brushes in winding slots in said stationary member polar portions with a gradation of turns decreasing from a maximum near the secondary commutating axis to a minimum near the primary commutating axis of said armature winding for providing substantially a uniform primary flux density and primary magnetomotive force throughout said stationary member polar portions.

6. A dynamoelectric machine of the amplidyne type having a stationary member with polar projections and an armature with a winding and a commutator connected thereto, a set of primary brushes and a set of secondary brushes electrically displaced from said primary brushes about said commutator adapted to provide a primary circuit and a secondary circuit respectively through said armature winding, means including a field exciting winding arranged to provide a component of magnetic excitation along the secondary commutating axis of said armature for controlling the secondary characteristics of said machine, means including a compensating field exciting winding energized in response to secondary current in said armature secondary circuit arranged to provide a component of magnetic excitation along the secondary commutating axis of said armature winding for substantially neutralizing mutual coupling of electric current in said armature secondary circuit with said control means, and means including a field exciting winding energized in response to primary current in said armature primary circuit and arranged in circuit with said primary brushes in winding slots in said stationary member polar projections with a gradation of turns decreasing from a maximum near the secondary commutating axis to a minimum near the primary commutating axis of said armature for providing substantially a uniform primary flux density and primary magnetomotive force throughout said stationary member polar projections.

7. A dynamoelectric machine of the amplidyne type having a stationary member with polar projections and an armature with a winding and a commutator connected thereto, a set of primary brushes and a set of secondary brushes electrically displaced from said primary brushes about said commutator adapted to provide a primary circuit and a secondary circuit respectively through said armature winding, means including a field exciting winding arranged to provide a component of magnetic excitation along the secondary commutating axis of said armature for controlling the secondary characteristics of said machine, means including a compensating field exciting winding energized in response to current in said armature secondary circuit arranged to provide a component of magnetic excitation along the secondary commutating axis of said armature for substantially neutralizing mutual coupling of electric current in said armature secondary circuit with said control means, and means including a field exciting winding energized in response to primary current in said armature primary circuit and arranged in circuit with said primary brushes in winding slots in said stationary member polar projections with a gradation of turns decreasing from a maximum near the secondary commutating axis to a minimum near the primary commutating axis of said armature energized in response to primary current in said armature primary circuit arranged to provide a component of excitation to said polar projections for providing substantially a uniform primary flux density and primary magnetomotive force throughout said stationary member polar projections.

CHARLES A. THOMAS.

REFERENCES CITED

The following references are of record in the file of this patent:

UNITED STATES PATENTS

| Number | Name | Date |
| --- | --- | --- |
| 2,238,811 | Crever | Apr. 15, 1941 |
| 2,252,445 | Stratton | Aug. 12, 1941 |
| 2,303,293 | Thomas | Nov. 24, 1942 |
| 2,394,049 | Fisher | Feb. 5, 1946 |